United States Patent [19]

Rumminger

[11] Patent Number: 4,557,497
[45] Date of Patent: Dec. 10, 1985

[54] TANDEM TRAILER

[76] Inventor: William J. Rumminger, 6103 Salt Lick Cir., Grand Blanc, Mich. 48439

[21] Appl. No.: 468,703

[22] Filed: Feb. 22, 1983

[51] Int. Cl.$^4$ .............................................. B60D 1/14
[52] U.S. Cl. .................................. 280/403; 280/407; 280/80 B; 296/146
[58] Field of Search .................. 280/403, 408, 411 C, 280/412, 423 A, 476 R, 482, 80 B, 407, 82; 296/181, 52, 146; 105/8 R

[56]  References Cited

U.S. PATENT DOCUMENTS

| | | | |
|---|---|---|---|
| 3,104,910 | 9/1963 | Kappen | 296/52 |
| 3,244,434 | 4/1966 | Reed et al. | 280/407 X |
| 3,246,912 | 4/1966 | Cunha | 280/80 B |
| 3,727,945 | 4/1973 | Parker | 280/408 |
| 3,987,919 | 10/1976 | Weeks et al. | 280/80 B X |
| 4,030,171 | 6/1977 | Arguin | 280/408 |
| 4,230,335 | 10/1980 | Glassmeyer | 280/423 A |
| 4,273,347 | 6/1981 | Hulse | 280/80 B |
| 4,303,258 | 12/1981 | Davis | 280/403 |
| 4,379,585 | 4/1983 | Strick | 296/146 |

Primary Examiner—Joseph F. Peters, Jr.
Assistant Examiner—Michael Mar
Attorney, Agent, or Firm—Krass and Young

[57] ABSTRACT

A trailer system comprising a lead trailer van and a pup trailer van adapted to be pulled by a tractor secured to the forward end of the lead trailer employs a lead trailer with an overhead sliding rear door and a pup trailer with a conventional door at its rear end and an overhead sliding door at its nose end. The coupling between the trailers is adjustable in effective length so that when it is in its extended position the vans may be trailed in a normal manner and may articulate relative to one another and when in its retracted position, assumed during loading, the rear end of the lead trailer and forward end of the pup trailer directly abut one another. In this position the overhead doors may be opened to form a continuous passageway through the two trailers for the purpose of loading and unloading.

9 Claims, 4 Drawing Figures

TANDEM TRAILER

DESCRIPTION

1. Background of the Invention

This invention relates to a coupled trailer van double system consisting of a lead trailer adapted to be pulled by a tractor and a following pup trailer van joined together which allow the opposing ends of the vans to be opened while the vans are in abutting position to form a continuous passageway for loading and unloading.

2. Prior Art

The length of a van trailer or semi-trailer is limited because the turning radius and turning clearance required increase in proportion to the length. In order to obtain the load carrying ability of a large trailer without unduly limiting the units maneuvering capability, twin trailer arrangements have been used wherein a lead trailer pulls a second, pup trailer van through an articulated coupling or drawbar. Arrangements of this type are disclosed in U.S. Pat. Nos. 4,230,335 and 4,030,171.

While these tandem units provide large load carrying capacity without compromising maneuverability they are difficult to load and unload because the pup or rear trailer must be removed in order to gain access to the rear of the lead trailer for loading and unloading purposes. A complicated series of maneuvers must be performed when a tandem trailer combination reaches a drop-off point where the load carried in the lead trailer is to be unloaded. The room required for this maneuvering is often not available so that the use of tandem trailers has generally been limited to relatively special circumstances.

3. Summary of the Invention

The present invention is directed toward a tandem trailer conbination in which the lead trailer can be loaded and unloaded without uncoupling and removing the pup trailer. Broadly, the present invention employs a lead trailer having an overhead roll-up door, a curtain door, or some other form of door that does not require any clearance on its outer side when opening and closing. The pup trailer is provided with the same type of door at its nose and its rear end is provided with any form of conventional door.

The lead and pup trailer are joined together by an articulating linkage that may be adjusted in effective length and locked in place. For normal trailing operation the coupling is locked at an extended length so that the rear end of the rear trailer and the nose of the pup trailer do not interfere with one another during maneuvering. When the lead trailer is to be loaded or unloaded the rear of the pup trailer is backed up to a loading dock and the brakes are engaged. The coupling is then unlocked and the trailer is backed up, forcing the coupling to shorten and bringing the rear door of the lead trailer into abutment with the nose door of the pup trailer. The adjoining doors are then opened so that two trailers form a continuous roadway and the lead trailer may be loaded or unloaded by passing through the open end doors of the pup trailer.

In a preferred embodiment of the invention, which will subsequently be disclosed in detail, the adjustability of the coupling is achieved by providing a sliding axle for the rear wheels of the lead trailer, securing a pintle hook to the slide, and joining the eye formed at the end of the draw bar on a dolly converter type fifth wheel assembly for the rear trailer to the pintle hook. This arrangement allows the lead trailer to be backed into the braked pup trailer, at a loading dock, by releasing the lock bar on the sliding axle so that the lead trailer is freed from the brakes. Other forms of adjustable length couplings might be employed with the invention.

DESCRIPTION OF THE DRAWINGS

Other objectives, advantages and applications of the present invention will be made apparent by the following detailed description of a preferred embodiment to the invention. The description makes reference to the accompanying drawings in which.

DETAILED DESCRIPTION OF A PREFERRED EMBODIMENT OF THE INVENTION

Figure 1:
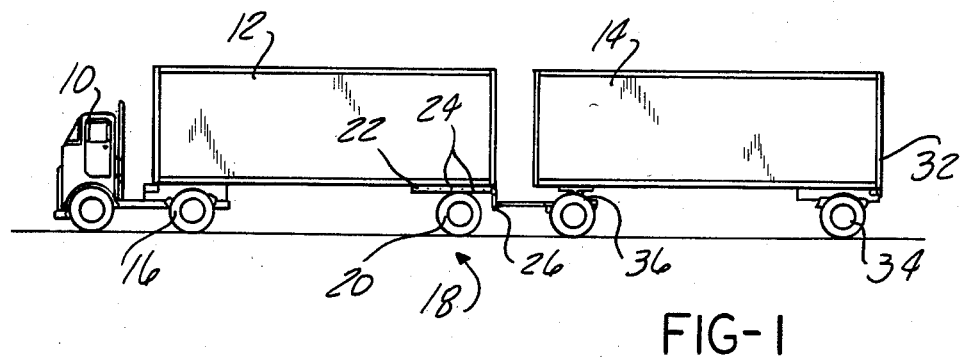
FIG. 1 is a side view of a tandem pair of semi-trailer van doubles constructed in accordance with a first embodiment of the present invention employing a pintle hook attached to a sliding axle formed at the rear of the lead trailer.

Referring to FIG. 1, a peferred embodiment of the invention consists of a tandem trailer system or set of van doubles consisting of a highway tractor 10, a forward or lead van type semi-trailer 12 and a following or pup van type trailer 14. The lead semi-trailer 12 and rear trailer 14 are of the enclosed van type.

The forward end of the lead trailer 12 is supported on the fifth wheel assembly 16 formed at the rear of the tractor 10, in a conventional manner. The rear end of the lead trailer 12 is supported on a wheel assembly, generally indicated at 18, supported on a longitudinally adjustable sliding axle 20. This single axle is of a conventional sliding type used for the rear wheel assembly of trailers for purposes of adjustment of the weight distribution and turning ability of the trailer. Conventional sliding wheel assemblies often employ tandem axles but single axle sliding assemblies have been used in certain situations. The sliding axle assembly includes a pair of slide rails 22 attached to the opposed longitudinal undersides of the lead trailer frame adjacent to its rear end. The slide rails 22 have a series of holes 24 spaced along their side edges and a lock bar may be inserted into one of the holes into a complimentary hole in the axle assembly 20 in order to secure the axle in a given longitudinal position with respect to the trailer 12.

A pintle hook 26 is fixed to the rear end of the sliding axle assembly so that the position of the pintle hook with respect to the lead trailer 12, and accordingly the spacing between the lead trailer 12 and the pup trailer 14, which is attached to the pintle hook by suitable connecting mechanism, may be adjusted longitudinally.

Figure 2:
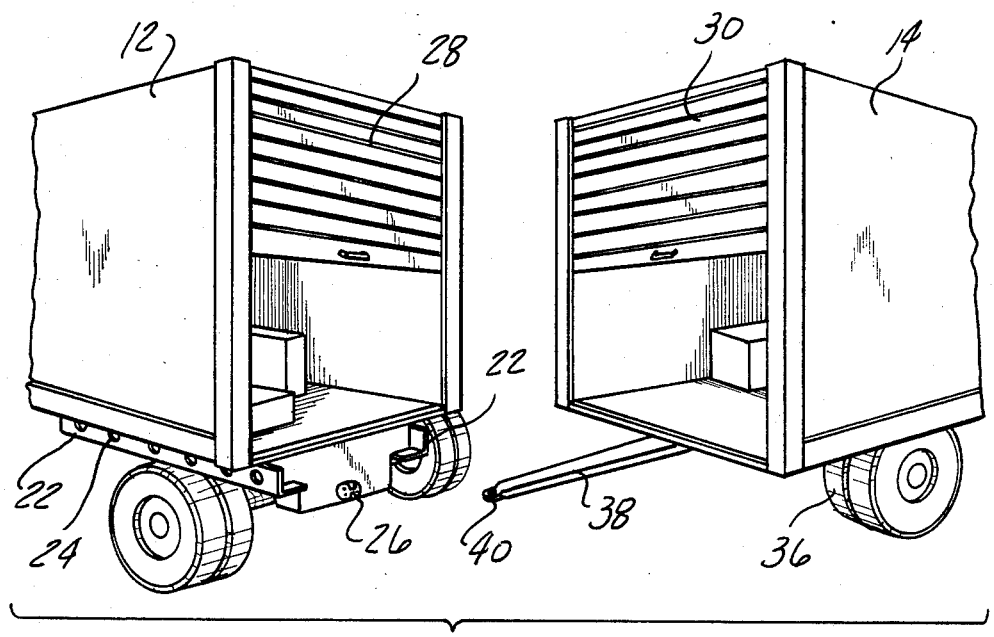
FIG. 2 is a perspective view of the adjacent ends of the lead and van trailers formed in accordance with FIG. 1, decoupled from one another.

As seen in FIG. 2, the lead trailer 12 is equipped with an overhead sliding door 28. Other forms of rear doors may be employed on the lead trailer in alternative embodiments of the invention but it is critical that the door open to give full access to the rear side of the trailer and that it open without requiring a substantial clearance beyond the confines of the trailer. Accordingly, side wall sliding doors could be employed as well as other known forms of doors which do not project outwardly from the opening as they move between their opened and closed position.

The pup trailer van 14 also has an overhead door 30 at its forward or nose end and the same qualifications made with respect to the rear door 28 of the lead trailer applied to this unusual nose door; i.e., it must fully open the nose end of the pup trailer and must open without any substantial forward clearance. The rear end of the pup trailer may employ any conventional form of door 32, such as a swinging door.

The pup trailer has a conventional rear wheel assembly 34 and its forward wheel assembly is preferably formed by a dolly converter 36 which attaches to the kingpin of the pup trailer (not shown). The dolly converter includes a forward extending tongue 38 with an eye 40 at its forward end which attaches to the pindle hook 26 at the rear of the sliding axle assembly 18.

By moving the sliding axle assembly 18 at the rear end of the lead trailer toward its rear position, the rear end of the lead trailer van and the nose end of the pup van are spaced from one another a sufficient distance to allow normal use of the tandem assembly. That spacing is illustrated in FIG. 1.

Figure 3:
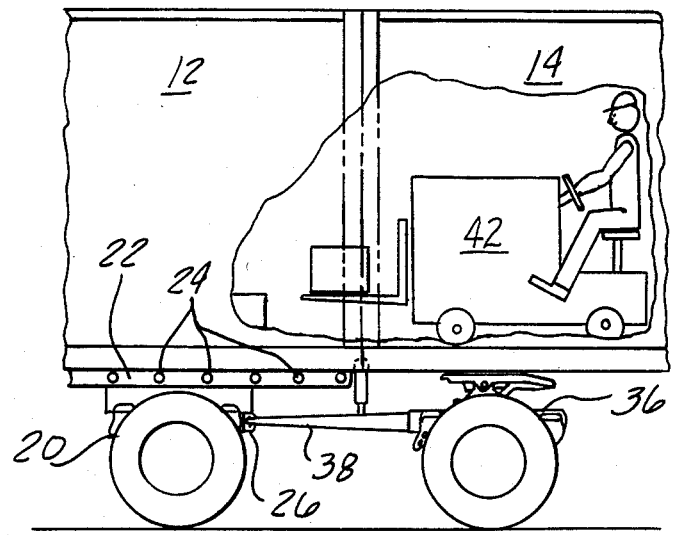
FIG. 3 is a side view of the van double configuration of FIG. 1 and 2 with the trailer ends in abutting relationship for loading with a section broken away to illustrate a lift truck passing through the interiors of the combined trailers.

The sliding wheel assembly may also be moved longitudinally forward so as to draw the opposed doors of the lead pup trailer into substantial abutment, as illustrated in FIG. 3, for loading and unloading purposes.

In use, on the road, the sliding axle is locked in its rear position so that the assembly has the spacing illustrated in FIG. 1 and may be used in a normal manner on the road. When the vans are to be loaded and unloaded the assembly is backed in so that the rear end of the pup trailer is adjacent to a loading dock. Then the trailer brakes are locked and the lock bar on the sliding axle is released. The tractor is then backed up forcing the sliding axle to move forwardly until the forward door of the pup trailer and the rear door of the lead trailer are in abutment, as illustrated in FIG. 3. The lock bar is again locked in the forward position and the overhead doors are opened to form a continuous compartment between the lead and van trailers.

As illustrated in FIG. 3, both trailers may be loaded and unloaded using a lift truck 42 or the like. When the loading or unloading is completed the axle lock bar is released, the tractor 10 pulls the lead trailer 12 forward so that the sliding axle 18 is drawn rearwardly and then the sliding axle is relocked in this rearward position and the assembly is ready for the road.

Figure 4:
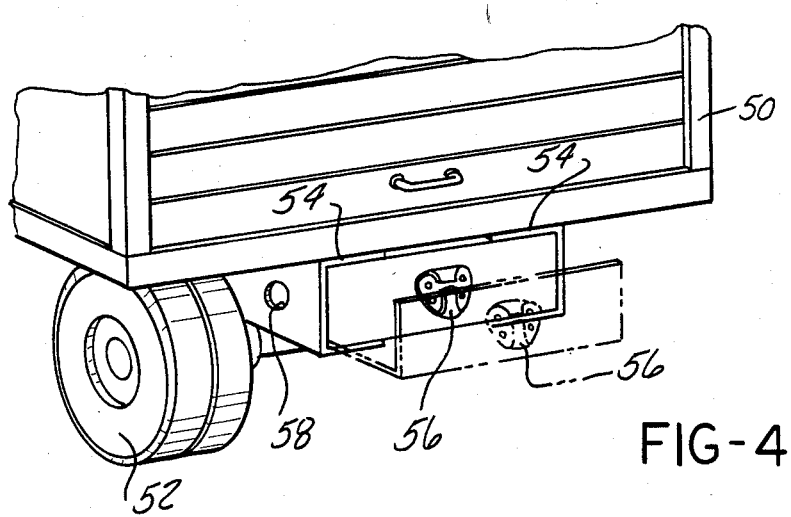
FIG. 4 is a perspective view of the rear of an alternative embodiment of the invention wherein the pintle hook is connected to a slide attached to the frame of the lead trailer.

FIG. 4 illustrates an alternative form of pindle hook slide arrangement. The lead trailer 50 has a conventional fixed rear axle assembly 52. A pair of slide rails 54 are attached to the opposite longitudinal undersides of the trailer frame above the axle of the wheel assembly 52. A slide 56 carrying a pindle hook is supported within the slide rails 54 so that it may be adjusted through use of a lock bar extending through holes 58 in the sides of the slide rail. In this manner the slide connection is made independent to the wheel assembly.

Other forms adjustable length couplings extending between the lead and pup trailers might also be employed. For example, the telescoping draw bar of U.S. Pat. No. 4,230,335 could be used in connection with the present invention. It should be understood that the adjustable connection need not be at the rear end of the lead trailer but could be achieved through an adjustable slide or axle attached to the forward end of the pup trailer.

I claim:

1. A tandem trailer assembly adapted to be pulled by a tractor and comprising:
   a lead trailer van having sidewalls, a covering roof, and a door at its rear end;
   a pup trailer van having sidewalls, a covering roof, a door at its forward end, and a second door at its rear end;
   a rear wall assembly positioned beneath the rear end of said pup trailer van;
   a front wheel assembly pivotally positioned beneath the forward end of said pup trailer van;
   elongated coupling means extending between said trailer vans with the front end of said coupling means pivotally secured to the rear end of said lead trailer van and the rear end of said coupling means fixedly secured to said front wheel assembly of said pup trailer van; and
   means for adjusting the effective length of said coupling means so that the abutting ends of the lead trailer van and pup trailer van may be spaced a relatively large distance from one another so that the trailer vans are free to articulate relative to one another for trailing action or may be closely spaced so that when the adjacent doors of the lead and pup trailer vans are opened, a single enclosed through passage for loading and unloading both of the trailer vans is established.

2. The trailer assembly of claim 1 in which said front wheel assembly comprises a dolly converter and said elongated coupling means comprises a forwardly projecting tongue portion of said dolly converter.

3. The trailer assembly of claim 1 in which the door at the rear of the lead trailer van and the door at the front of the pup trailer van are overhead sliding doors.

4. A tandem trailer assembly adapted to be pulled by a tractor and comprising:
   a lead trailer van having sidewalls and a covering roof and a door at its rear end;
   a pup trailer van having sidewalls and a covering roof, a door at its forward end and a second door at its rear end;
   a rear wheel assembly positioned beneath the rear end of said pup trailer van;
   a front wheel assembly pivotally positioned beneath the forward end of said pup trailer van;
   a tongue extending between the rear end of said lead trailer van and the forward end of said pup trailer van with the front end of said tongue pivotally connected to the rear end of said lead trailer van and the rear end of said tongue fixedly secured to said front wheel assembly and;
   means for longitudinally adjusting the point of pivotal connection of said front end of said tongue to said rear end of said lead trailer van between a first travel position in which the rear end of the lead trailer van and the forward end of the pup trailer van are spaced a relatively large distance from one another so that the trailer vans are free to articulate relative to one another for trailing action and a second loading position in which the pivotal connection is spaced forwardly on said lead trailer van with respect to said first travel position, wherein the rear end of the lead trailer van and the forward end of the pup trailer van are closely spaced so that the adjacent doors of the lead and pup vans may be opened to provide a single continuous enclosed passage for loading and unloading both of the trailer vans.

5. The trailer assembly of claim 4 wherein said adjusting means includes a longitudinally adjustable slide member supported beneath the rear end of said lead trailer van and means for pivotally securing said front end of said tongue to the rear end of said slide member.

6. The trailer assembly of claim 5 wherein the longitudinally adjustable slide member is formed by a member secured to an adjustably supported wheel assembly positioned beneath said lead trailer van.

7. The trailer assembly of claim 5 in which said adjustable slide member is slidably mounted on a fixed wheel assembly secured beneath said lead trailer van.

8. The trailer assembly of claim 5 in which said lead trailer van includes a steel frame and said adjustable slide member is secured directly to the frame of said lead trailer van.

9. The trailer assembly of claim 5 in which a dolly converter forms said front wheel assembly of said pup trailer van and the front end of said tongue is pivotally connected to a pintle hook slidably supported on said lead trailer van.

* * * * *